Patented Mar. 26, 1935

1,995,598

UNITED STATES PATENT OFFICE 1,995,598

DUST FIXATIVE

Francis M. Archibald, Elizabeth, N. J., assignor to Standard Oil Development Company, a corporation of Delaware No Drawing. Application September 2, 1932, Serial No. 631,586

10 Claims. (Cl. 94—25)

The invention relates to the manufacture of a solution suitable for spraying upon dust laden air or deposited dirt in coal mines, grain elevators, or on roadways, etc., to fix the material sprayed upon and inhibit the formation of dust. The invention relates particularly to the manufacture of a dust fixative that will settle the dust as a solid, tenacious mass.

This invention has for one of its principal objects the provision of a solution which, when sprayed upon dirt roads, will inhibit the formation of dust.

Further objects will appear as the description proceeds.

Alkali sulphonates are prepared from the acid sludges separated from petroleum oil, shale oil or ozokerite, etc. after treatment with sulphuric acid. The major part of the free sulphuric acid is removed from the acid sludge by washing with a controlled amount of water at elevated temperature and the separated sludge is neutralized with an alkali. By alkali herein is meant alkali metals, alkaline earth metals, and ammonia or equivalent basic non-metallic compound.

The alkali sulphonates are dissolved in a suitable solvent, preferably water, to make a solution of about 3 to 20% concentration. The water solution of alkali sulphonates may be used as such or incorporated with other ingredients. From 1 to 10% of a hygroscopic material such as glycerin, calcium chloride, etc., may be added. Plasticizing materials such as glue, glucose, emulsified asphalt, asphaltic oil, etc., may also be added in the same proportions, with or without the hygroscopic material. The addition of hygroscopic and plasticizing materials either separately or jointly tends to make the cemented dust less brittle so that it will resist attrition.

As one example illustrating the invention, acid sludge recovered after treating an oil of 85 seconds viscosity at 100° C. with fuming sulphuric acid at 35° C. was mixed with water and the free sulphuric acid separated. The remaining sludge was neutralized with sodium hydroxide to form sodium sulphonate. A 15% water solution of the sodium sulphonate was prepared and sprayed upon a dirt road in quantity sufficient to wet the surface thoroughly. Within 24 hours the surface of the road was covered with a solid layer of cemented dust. Portions of this layer were broken up and shaken in a bottle. No tendency to form dust was shown.

The dust fixative is of special value for application on dirt roads. Where the dirt surface coating is loose and of appreciable depth, the addition of emulsified asphalt or asphalt oil is found to be of value as the sulphonate solution together with emulsified asphalt solidify the loose dirt and forms a solid tenacious surface. Hygroscopic materials such as calcium chloride, etc., which react with alkali sulphonates to form water insoluble compounds are not incorporated in the sulphonate solutions. They are used by either spraying the roads before or after spraying with the sulphonate solution.

It will be understood that the foregoing description is merely illustrative of the invention, and various changes and alternative procedures and proportions may be adopted within the scope of the appended claims in which it is my intention to claim all novelty as broadly as the prior art permits.

I claim:

1. A dust fixative, comprising a water solution of an alkali sulphonate derived from mineral oil and a hygroscopic material.

2. A dust fixative, comprising 3 to 20% of an alkali sulphonate derived from mineral oil dissolved in water and 1% to 10% of a hygroscopic material.

3. A dust fixative, comprising 3 to 20% of an alkali sulphonate derived from mineral oil dissolved in water and 1 to 10% of a plasticizing material.

4. A dust fixative, comprising 3 to 20% of a water soluble alkali sulphonate derived from mineral oil, 1 to 10% of a hygroscopic material and 1 to 10% of a plasticizing material.

5. A method of fixing dust, which comprises spraying the dust-containing material with a solution of a water soluble alkali sulphonate derived from mineral oil containing a hygroscopic material.

6. A method of fixing dust on a roadway, which comprises spraying a water solution of alkali sulphonate derived from mineral oil on the surface of the road and allowing the water to evaporate.

7. A method of fixing dust, which comprises spraying a water solution of 3 to 20% of alkali sulphonate derived from mineral oil, 1 to 10% of a hygroscopic material and 1 to 10% of a plasticizer on the surface of a roadway and allow the solvent water to evaporate.

8. The method according to claim 7, in which the hygroscopic agent is glycerin.

9. The method according to claim 7, in which the plasticizing material is glucose.

10. The method according to claim 7, in which the plasticizing material is emulsified asphalt.

FRANCIS M. ARCHIBALD.